United States Patent Office 3,721,239
Patented Mar. 20, 1973

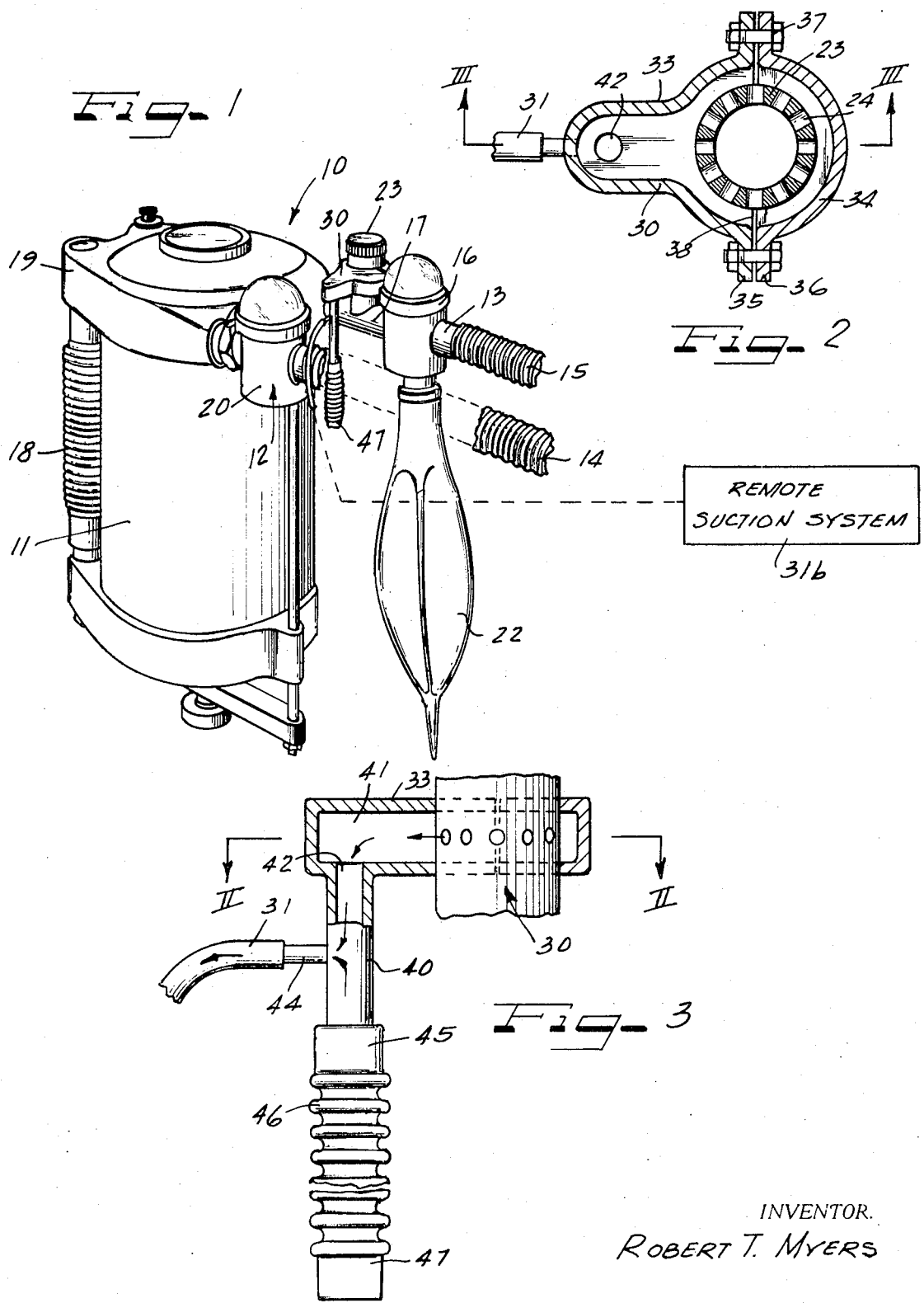

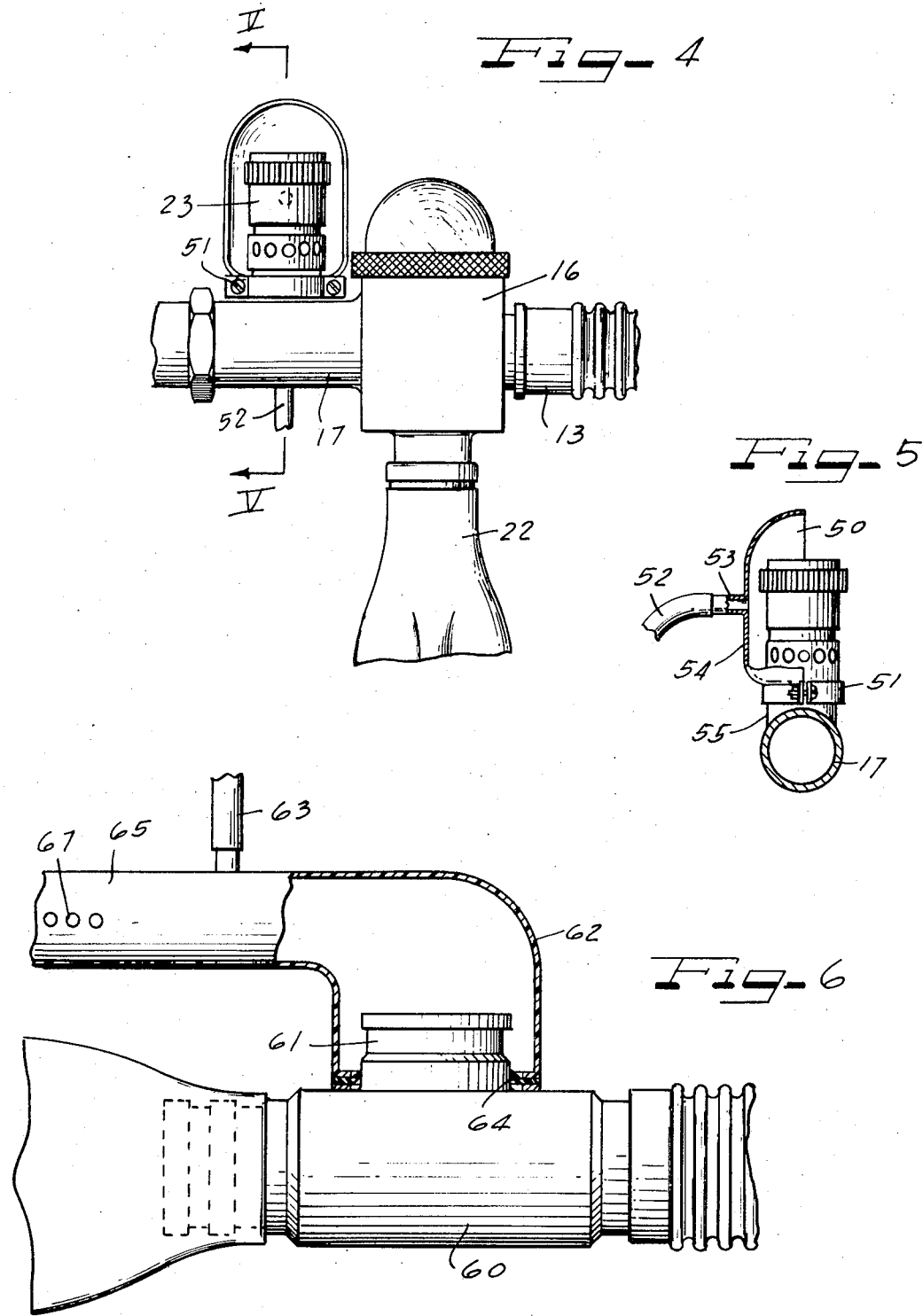

3,721,239
ANESTHETIC GAS EXHAUST SYSTEM
Robert T. Myers, 2521 W. Bacon Drive,
Peoria, Ill. 61614
Filed July 9, 1969, Ser. No. 840,439
Int. Cl. A61m 17/00
U.S. Cl. 128—188                                21 Claims

ABSTRACT OF THE DISCLOSURE

A system utilizing the air suction system of an operating room to exhaust anesthetic gases from an anesthesia supply in assembly and especially in a preferred embodiment by use of an exhaust manifold in association with the pop valve of a rebreather system.

BACKGROUND OF THE INVENTION

Field of the invention

This invention relates to anesthetic gas supply systems and more particularly to a system for removing used anesthetic gases from the operating theatre.

Prior art

Hospital operating rooms are undergoing increased usage involving more and longer operations. A great many operations today are conducted under general anesthetic and incorporate the mixture of anesthetic gases with the patient's air supply.

Many anesthetic supply systems today incorporate a semiclosed system where the exhalation products from the patient's lungs, including the anesthetic gases, are filtered through a chemical filter to remove carbon dioxide and then reintroduced along with additional new gases to the inhalation stream. A pop valve is usually incorporated in the stream to provide for the release of excess pressure, the pop valve being adjustable to maintain a desired pressure level.

Gases escaping from the bleed holes of the pop valve are generally vented to the operating room atmosphere. Other systems are of the non-rebreathing type where the exhalation gases are vented directly to the atmosphere. In both types the amount of anesthetic used is generally greater than the amount retained by the patient. For this reason the gases vented, whether from the pop valve or from the vent valve of the non-rebreathing systems, contain a degree of anesthetic.

While this does not present a problem immediately, gas buildup can occur during prolonged operations or during frequent usage of the system. Such gas buildup can adversely affect the performance of the medical team at work in the operating room. Additionally, the presence of certain anesthetic gases in high degrees of concentration in the operating room can present hazardous conditions. Many anesthetic gases are heavier than air and are difficult to evacuate from the operating room. Although most operating rooms are supplied with air filtration and circulation systems, an increase in the flow of air sufficient to insure evacuation of anesthetic gases will create undesirable air currents in the room as well as adversely affecting the filtration system.

Because of the fact that the majority of the gas utilized to anesthetize the patient is either absorbed by the patient or recycled through the system, heretofore little has been done to insure the removal of bled-off gases from the operating theatre.

SUMMARY OF THE INVENTION

The present invention is directed towards the provision of a system for removal of such gases from the operating theatre in an economical manner. The system is designed, in one embodiment, to be adaptable to present anesthetic supply systems and does not require a large degree of additional equipment.

Most operating rooms in state-of-the-art equipped hospitals have associated therewith air suction systems. Such systems are utilized to power a large variety of medical equipment and devices. These systems are usually operated from a central point with the suction piped into the operating room. Such systems are therefore ideally utilizable for removal of excess anesthetic gases from the operating room. The present invention contemplates the provision of a suction-driven exhaust system which will draw off anesthetic gases from the pop-off or vent valve. In one embodiment, the system comprises a manifold for encircling the bleed portion of the valve. The manifold has a connection with the suction source and further has associated therewith atmospheric bleed holes which will prevent the existence of a negative pressure in the anesthetic system. Also associated therewith may be a surge reservoir adapted to accommodate large-volume short duration surges from the valve.

In other embodiments, the manifold may take the place of a hemispherical shield encompassing a portion of the pop valve or the manifold may be created integrally with the valve.

It is therefore an object of this invention to provide a system of removal of anesthetic gases from an operating room.

It is another object of this invention to provide a system of removal of anesthetic gases from an operating theatre which is economically compatible with existent anesthetic supply systems.

It is a further and more specific object of this invention to provide a system for the removal of anesthetic gases bled from an anesthesia supply system by means of a connection to the operating room air suction system.

It is yet another and more specific object of this invention to provide an attachment for anesthetic supply systems adjacent the pop-off or bleed valve which will exhaust anesthetic gases from said valve exteriorly of the operating room.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view of a portion of an anesthetic supply system equipped with the exhaust manifold of this invention.

FIG. 2 is a fragmentary, cross-sectional view of a preferred embodiment of the exhaust manifold of this invention taken along the lines II—II of FIG. 3.

FIG. 3 is a fragmentary view partially in section of the manifold of FIG. 2 taken along the lines III—III of FIG. 2.

FIG. 4 is a plan view of a modified form of the exhaust manifold of this invention.

FIG. 5 is a fragmentary cross-sectional view of the exhaust manifold of FIG. 4 taken along the lines V—V.

FIG. 6 is a fragmentary partially sectional view of another embodiment of this invention used in connection with a different type of valve.

DESCRIPTION OF THE PREFERRED EMBODIMENTS

FIG. 1 illustrates a portion of an anesthetic supply system 10 including the absorber 11 and associated valving and tubing. The absorber 11 is of a standard type and has an inhalation side 12 and an exhalation side 13. Tubing 14 and 15 connects the absorber through a face mask to the patient. Gases exhalated by the patient pass through the tubing 15, a one-way valve 16 and secondary tubing 17 to the absorber 11. Thereafter the gases are filtered down through the absorber which is usually filled with a chemical which is capable of absorbing $CO_2$. Thereafter the freshened gas is passed through tubing 18 to the upper portion 19 of the absorber where additional anesthetic and other gases may be added to the stream. These combined gases then exit from the absorber through a one-way valve 20 to the tubing 14.

This type of system is known as a rebreathing system where portions of the exhalated gas, after absorption of $CO_2$, are reintroduced to the inhalation stream. In this manner, anesthetic gases which are not absorbed by the patient remain in the system for reintroduction to the patient, resulting in the use of a smaller amount of anesthetic.

One-way valve 16 may have associated therewith a reservoir bag 22 which inflates and deflates in dependent relation to the patient's breathing.

In order to prevent a pressure buildup in the system, which may be caused by exhalation of a greater amount of gases than the system can handle at a desired pressure level, a pop valve 23 is associated with the tubing 17.

The pop valve 23 may be spring loaded and is normally adjustable so as to provide release when the pressure in the system exceeds a desired level.

As illustrated in FIG. 3, the pop valve 23 has a plurality of exhaust ports 24 circumferentially therearound. These ports bleed excessive pressure in the tubing 17 to the ambient atmosphere. While the pop valve 23 is not consistently open, during the course of a long operation a sufficiently large quantity of exhaled anesthetic gases may be bled from the pop valve 23 to provide a dangerous condition in the operating room. The present invention provides a method and system for the removal of such gas from the operating room area. In one embodiment, the system consists of a manifold 30 which is attached around the bleed holes 24 of the pop valve 23 and which channels gases therefrom to piping 31 connected with the operating room's vacuum suction system 31b. Thus, the exhaust area of the pop valve 23 is continuously surrounded by an air current drawing to the vacuum system.

Most modern hospitals are equipped with centrally located multi-station air suction or vacuum supply systems. These systems are usually piped into the operating rooms and are used in connection with a variety of medical and surgical devices. For safety reasons, the electrical equipment used to power such suction systems and the air pumps associated therewith are located remote from the operating room and are therefore ideally usable in connection with this system inasmuch as gases taken from the operating room will be exhausted into the atmosphere at some remote location.

In order to minimize the negative pressure existent in the manifold, the manifold is not sealed. This may be accomplished in a number of ways such as the provision of openings in the manifold. In the embodiment illustrated in FIG. 2, the main portion of the manifold 30 consists of two mating parts 33 and 34 each of which is adapted to hemispherically encircle the pop valve 23 and the area of the ports 24 and each of which has a mating flange 35 and 36 for attachment with the other. Thus, in the embodiment illustrated, the manifold parts 33 and 34 are attached as by bolts 37 passing through apertures 35 and 36. If the dimensions of the manifold parts are set so as to prevent complete engagement at the flanges when the parts are in encircling relation to the pop valve, then a radial gap 38 will be present between the manifold parts 33 and 34. The radial gap 38 provides an air inlet to the interior of the manifold which air inlet will continuously supply air to the suction system thereby reducing the pressure drop around the pop valve. However, inasmuch as the gap 38 supplies air directly to the manifold around the pop valve, it can be seen that any gases escaping from the pop valve will follow the path of least resistance and be drawn into the suction system rather than pass outwardly through the gap.

In the embodiment illustrated in FIGS. 1, 2, and 3, the portion 33 of the manifold 30 has tubing 40 depending from the underside thereof and communicating with the hollow interior 41 of the manifold through an opening 42. The tubing 40 has side tubing 44 projecting therefrom which is connected to the suction system through the member 31. The tubing 44 projects from the tubing 40 intermittent the ends thereof. Attached to the bottom end 45 of the tubing 40 is a corrugated hose member 46 which is flexible and which is corrugated in a bellows fashion.

Preferably, the tubing 40 is kept short so as to minimize the amount of rigid material added to the anesthesia system by the provision of a manifold. The elastomeric tubing 46 therefore extends the distance of the tubing 40 to a length such that given equal pressure on the open end of the rubber tubing 46 and in the manifold area 41, air will normally be drawn from the manifold by the suction system. However, whenever the pressure in the area 41 falls below the air pressure exterior of the tubing, air will be sucked from the open bottom end of the tubing 46. The tubing 46, the tube 40 and the tube 44 are dimensioned and placed so that when the pressure in the manifold and the atmospheric pressure at the open end 47 are the same, due to the dynamics of fluid flow more air will be sucked from the manifold than from the open end. It can therefore be seen that as the pressure in the manifold is reduced as by removal of the air by the suction system with the valve 23 closed, that the majority of suction will be accommodated by the air from the open end 47. This prevents the buildup of a negative pressure in the manifold 41. This device may be used with the open radial split 38 illustrated in FIG. 2 or may be used independently thereby allowing the manifold halves 33 and 34 to be dimensioned to sealingly contact one another at the flanges 35 and 36.

The hose 46 also provides for surge storage. That is to say that if the gases bled from the pop valve 23 exceed the amount that can be normally drawn off through the suction system 31 thereby creating a greater-than-average pressure in the area 41, these gases can expand into the hose 46 momentarily before they are then redrawn into the suction system 31. Additionally, in order to prevent escape of anesthetic gases from the hose 46, a one-way valve may be installed at the open bottom end 47 thereof. This valve will allow the external atmosphere to be drawn into the hose but will prevent internal atmosphere from the manifold 30 escaping from the hose. In such cases where one-way valving is utilized in the hose, care should be taken to assure that the internal area of the hose is sufficiently great to accumulate any surge release from the pop valve without creating a restrictive pressure in the manifold which might adversely affect the rebreathing system by creating greather-than-desired internal pressures through the pop valve. This may be obtained either by using a hose of sufficient length or one which is sufficiently thin-walled in cross-section and bellows-corrugated so as to be expansible under minimal internal pressures.

It will be appreciated that the above-described anesthetic gas removal system is easily adaptable to present absorber systems and provides a minimum amount of additional equipment. The system is quickly attachable and readily detachable for cleaning and sterilization. Although the manifold has been described in the preferred embodiment as an accessory piece attachable to an existent pop valve, it is to be understood that the teachings of this invention include the integral provision of a gas collecting manifold in connection with a pop valve. The manifold may be cast as an element of the pop valve or the valve itself may be redesigned to include the suction withdrawal system.

FIGS. 4 and 5 illustrate a modified form of the invention usable with standard pop valves. For purposes of convenience like numerals are used to illustrate components the same as shown in FIG. 1. In this embodiment, the encompassing manifold of FIG. 1 is replaced by a hemispherical shield or hood 50 which is attached to the pop valve by means of a bracket 51. The tubing 52 from the suction system is attached to a protruding port 53 in the back 54 of the hood 50. The hood does not completely encase the pop-off valve and is open to the atmosphere. This provides a constant stream of air flowing past the pop-off valve through the port 53 and into the suction system 52. When used in connection with high-velocity suction systems, this stream of air will be sufficiently strong to prevent escape of gas from the pop-off valve to the surrounding atmosphere without creating a large pressure drop adjacent the pop-off valve which might produce a negative pressure interfering with the set operation of the valve. It is to be understood that although the drawings illustrate the bracket 51 as having been attached to the T throat 55 of the tubing 17, that brackets could be attached to the tubing themselves, or the hood could be manufactured integral with either the valve or the tubing.

FIG. 6 illustrates a modification of my system adapted to be used with a non-rebreathing valve such as the type commonly referred to as a Digby Leigh valve. Such valves are used in connection with anesthetic supply systems which do not recirculate the exhalation gases. The valve 60 contains directional valving which will allow passage of anesthetic gases axially through the valve to the patient but which will direct exhalation products outwardly through the port 61 to the atmosphere. While such non-rebreathing systems are usually used with a lower concentration of anesthetic, invariably some of the anesthesia gas is exhaled by the patient. Because of the provision of the directional valve, the system can be designed to operate with a negative pressure adjacent the port 61. In the embodiment illustrated, a manifold 62 surrounds the port 61 and is connected to the suction supply 63. The manifold 62 may be made integral with the valve 60 or may be attached thereto in any convenient manner and may include a sealing gasket 64 to sealingly attach the manifold around the port 61. An extension 65 of the manifold may be connected to a surge reservoir such as an expansible bag or the hose 47 of FIG. 1.

Further, in those systems where it is desirable not to create a large negative pressure adjacent the port 61, a portion of the manifold 62 may be perforated as at 67 to allow entry of air to the suction system 63 when the port 61 is closed. The provision of air holes to prevent the existence of a negative pressure at the valve may be utilized in connection with any of the embodiments and may simply take the form of a perforated section of tubing in the suction stream which is dimensioned to control the negative pressure upstream of the perforated tube. It is to be understood that the anesthesia evacuation system of my invention may be constructed out of any material such as metal or plastic and in those instances where desired, such as in connection with the manifold 62 utilized in non-rebreathing anesthesia supply systems, may be constructed of a flexible elastomeric material so as to minimize structure interference with use of the supply system.

It can be seen from the above that my invention provides apparatus and system for the removal of anesthetic gases from an operating room through the standard vacuum supply system. It will be further appreciated that my system is readily adaptable to existent anesthesia supply systems as well as capable of being designed into new systems.

Although the teachings of my invention have herein been discussed with reference to specific theories and embodiments, it is to be understood that these are by way of illustration only and that others may wish to utilize my invention in different designs or applications.

I claim as my invention:

1. In an anesthesia supply system for supplying anesthetic gases to a patient in a room and having a pressure-regulated pop-off valve, the improvement of: conduit means connected to a suction system associated with said valve providing a low pressure exit path receiving gases bled from said valve, the said path terminating exteriorly of the room in which the anesthesia supply system is being used for discharging the received gases exteriorly of the said room, said conduit means including a manifold attached to the supply system independent of the operation of the valve and means downstream of the manifold and in direct communication with the suction system aspirating the conduit means and providing a flow of air through at least a portion of the conduit means independent of the operation of the valve.

2. A rebreathing anesthesia supply system comprising inhalation and exhalation closed gas flow paths, valving directing the gas flow, second valving including a valve assembly having lateral exhaust ports in said exhalation path venting said path in response to excessive pressure in said path, and means adjacent said second valving for collecting and removing gas vented by said second valving, said means including a suction system which exhausts remote from said supply system, said means including a manifold attached to the second valving exterior of the assembly, the said manifold substantially enclosing an area around the said exhaust ports exterior of the assembly, the suction system ported to the manifold and communicating with the area enclosed thereby.

3. An anesthetic gas exhaust system which includes a pressure-responsive pop valve attachable to an anesthesia supply system for venting the said supply system in response to internal pressures therein, the said pop valve having at least one exhaust port therein, the said exhaust port communicating to a manifold and the said manifold communicating to a suction system which exhausts remote from the said valve, the said system including a surge reservoir downstream of the manifold for storing exterior of the pop valve a greater amount of gases released from the pop valve than can be immediately accommodated by the said suction system, the said surge reservoir communicating to the said manifold and to the suction system.

4. The system of claim 2 including additional means for supplying atmosphere to the said suction system independent of the said means adjacent the said second valving when gas is not being vented by the said second valving whereby the pressure exteriorly adjacent the said second valving is greater than the pressure in the suction system.

5. An anesthetic gas removal system for use in connection with anesthetic breathing systems in hospital rooms equipped with remote station suction systems which comprises: a normally closed pressure-responsive pop valve located in the gas stream of the breathing system, said valve openable in response to internal pressure to vent gases from the said breathing system, means located adjacent said valve exteriorly of said breathing system for receiving gases vented from said system, said means operatively connected with the said suction system whereby gases received by said means will be drawn off into the suction system, said valve being radially venting and having bleed holes, said means including a manifold encircling the bleedhole portion of the valve, said manifold having attached thereto tubing connecting the manifold to the suction system, and second means for supplying ambient atmosphere air to the suction system through the tubing from the atmosphere exterior of the manifold to reduce the negative atmosphere at the valve.

6. An anesthetic gas removal system for use in connection with anesthetic breathing systems in hospital rooms equipped with remote station suction systems which comprises: a normally closed pressure-responsive pop valve located in the gas stream of the breathing system, said valve openable in response to internal pressure to vent gases from the said breathing system, means located adjacent said valve exteriorly of said breathing system for receiving gases vented from said system, said means operatively connected with the said suction system whereby gases received by said means will be drawn off into the suction system, said valve being radially venting and having bleed holes, said means including a manifold encircling the bleedhole portion of the valve, said manifold having attached thereto tubing connecting the manifold to the suction system, and second means for supplying ambient atmosphere air to the suction system through the tubing from the atmosphere exterior of the manifold to reduce the negative atmosphere pressure at the valve, said second means for supplying ambient atmosphere air provided by constructing the manifold in a plurality of pieces which are attached together with at least one gap therebetween capable of supplying ambient atmosphere air to the interior of the manifold.

7. The system of claim 6 wherein the said second means for supplying ambient atmosphere air comprises a tube depending from said manifold, said tube having an end communicating to the interior of said manifold and an open end remote from the manifold, tubing connecting to the suction system being connected to said tube intermediate the ends thereof closer to the manifold than to the said open end.

8. The system of claim 7 wherein a portion of said tube including the open end thereof comprises a flexible hose.

9. The system of claim 8 wherein the said flexible hose is dimensioned to provide a surge reservoir capable of momentarily storing a quantity of gases bled from the said valve which is greater than the suction system can accommodate in the given period of time.

10. In an anesthesia supply system having a conduit with a gas stream therein, a valve having a body, the body having exit ports, the said valve venting a portion of the gas stream exteriorly of the conduit, the improvement of a open hood manifold positioned adjacent said valve exterior of the said valve body, the said manifold attached to a suction system, a stream of air created by said suction system, said stream of air passing around the exit ports of the said valve into the said hood to aspirate the system and from the said hood into the suction system and the said suction system exhausting remote from the anesthetic supply system.

11. The system of claim 10 wherein the said hood manifold is attached adjacent to the said valve by detachable brackets fastenable to a portion of the tubing of the anesthesia supply system.

12. An anesthesia supply system, said system comprising anesthesia supply means and conduit, a valve in said conduit, said valve venting a portion of an anesthesia gas stream exteriorly of the system, a manifold positioned adjacent said valve receiving the portion of the gas stream vented by said valve, said manifold connected to a suction system, said suction system exhausting remote from the anesthetic system, and means venting the ambient atmosphere to the suction system preventing excess negative pressure adjacent the valve, said means positioned exterior of the valve and independent thereof, the means venting the ambient atmosphere continuously open to the suction system.

13. An anesthetic supply system for supplying anesthetic gases to a patient in a room, the supply system including a conduit with a pressure-regulated pop-off valve venting a portion of the gas stream from within the conduit, and means for withdrawing the gases vented by the valve from the room through a suction system exhausting exterior of the room, the improvement of the gas collecting means including a manifold attached to the system in proximity to the valve, the manifold receiving gases vented by the valve, the manifold being independent of the operation of the valve, the manifold having a second conduit connected thereto, the second conduit receiving the gases from the manifold, the second conduit attached to the suction system and aspirating means operatively associated with the gas collecting means for venting room atmosphere to the second conduit, said aspirating means preventing excess negative pressure adjacent the valve, the said aspirating means being independent of the valve, the said aspirating means providing a flow of air through the second conduit independent of the operation of the pop-off valve.

14. The system of claim 13 wherein the valve has a body portion projecting from the conduit, the body portion having bleed openings therein for venting the conduit and the manifold is attached adjacent the bleed openings.

15. The system of claim 14 wherein the manifold substantially encircles the valve in the area of the bleedholes defining a substantially closed area exterior of the bleedholes, the said area communicating with the said second conduit.

16. The system of claim 14 wherein the said manifold comprises a hood positioned adjacent the valve body, the said second conduit attached to the hood, the said hood defining an opening to the second condit, the said hood open to the atmosphere exterior of the valve, and the aspirating means comprising the opening of the hood to the atmosphere whereby a stream of atmosphere is introduced to the second conduit through the hood, the said stream flowing past the exhaust ports of the valve.

17. In an anesthetic supply system supplying anesthetic gases to a patient in a room, said system including a conduit with a valve attached thereto, the valve venting a portion of a gas stream from within the conduit to the exterior of the conduit, the valve having a body portion projecting from the conduit, the body portion having exhaust openings therein, the improvement of means attached to said system in proximity to said valve, said means receiving gases vented by said valve from said conduit, the said means including a manifold positioned to receive gases discharged from the valve, said manifold having a second conduit connected thereto, the second conduit receiving gases from the manifold, the second conduit attached to a suction system, the suction system exhausting outside of the room, the manifold having a body portion encircling a portion of the valve body and substantially enclosing the area exterior of the exhaust openings.

18. In an anesthesia supply system having a first conduit supplying anesthesia gases to a patient in a room and a second conduit receiving exhalant gases from the patient, said second conduit exhausting at least a portion of said exhalant gases to the surrounding atmosphere through an opening in said second conduit, the improvement of: gas removal means attached to said second conduit in juxtaposition to said opening, said removal means including a suction system and conduit means operatively connected to the suction system, the suction system in continuous open communication with the opening in the second conduit, said suction system exhausting remote from said room, said gas removal means effective to remove substantially all of the exhalant gases exhausted from the said opening from the room, and aspirating means is provided, said aspirating means supplying atmospheric air to the gas removal means at all times to provide an air flow stream to said suction system, said aspirating means effective to reduce the presence of excess negative pressure adjacent the said opening.

19. A non-rebreathing anesthetic supply system comprising a gas source including anesthetic gases, a conduit supplying gases from said gas source to a patient, a valve in said conduit, an opening from said conduit adjacent said valve, means responsive to the patient's inhalation and exhalation for opening and closing the valve, said valve directing exhalant gases from the patient through the said opening, gas removal means operatively connected to said system in juxtaposition to said opening, a suction system, said gas removal means including a conduit having an inlet open end thereof positioned adjacent said opening receiving gases therefrom and an outlet open end remote from the inlet open end operatively connected to the suction system, said suction system being in continuous open communication with the inlet open end of said conduit, and the said suction system exhausting remote from the room in which the anesthesia supply system is used.

20. A non-rebreathing anesthetic supply system comprising a gas source including anesthetic gases, a conduit supplying gases from said gas source to a patient, a valve in said conduit, an opening from said conduit adjacent said valve, means responsive to the patient's inhalation and exhalation for opening and closing the valve, said valve directing exhalant gases from the patient through the said opening, gas removal means operatively connected to said system in juxtaposition to said opening, a suction system, said gas removal means including a conduit having an inlet open end thereof positioned adjacent said opening receiving gases therefrom and an outlet open end remote from the inlet open end operatively connected to the suction system, said suction system being in continuous open communication with the inlet open end of said conduit, the said suction system exhausting remote from the room in which the anesthesia supply system is used, and aspirating means operatively connected to said gas removal means, said aspirating means preventing the existence of an excessive negative back pressure at the said opening sufficient to prevent operation of the valve.

21. The system of claim 20 further including surge reservoir means, said surge reservoir means connected to the gas removal means, said surge reservoir means dimensioned to temporarily contain exhalant gases in excess of those which the gas removal means can immediately remove.

References Cited

UNITED STATES PATENTS

| | | | |
|---|---|---|---|
| 3,276,446 | 10/1966 | Hay | 128—188 |
| 3,348,538 | 10/1967 | Benzel | 128—142 |
| 3,575,196 | 4/1971 | Marrese | 128—185 X |
| 2,275,534 | 3/1942 | Langsdorf | 128—188 |
| 3,058,463 | 10/1962 | Goodrich | 128—139 |
| 2,870,764 | 1/1959 | Carlson | 128—188 |
| 3,028,873 | 4/1962 | Kindred | 128—188 |

RICHARD A. GAUDET, Primary Examiner

G. F. DUNNE, Assistant Examiner

U.S. Cl. X.R.

137—312